(12) United States Patent
Lawrence

(10) Patent No.: US 6,371,055 B1
(45) Date of Patent: Apr. 16, 2002

(54) LEASH

(76) Inventor: Marianne Lawrence, 681 Northridge Dr., Bountiful, UT (US) 84010

( * ) Notice: Subject to any disclaimer, the term of this patent is extended or adjusted under 35 U.S.C. 154(b) by 0 days.

(21) Appl. No.: 09/560,452

(22) Filed: Apr. 28, 2000

(51) Int. Cl.$^7$ .............................................. A01K 27/00
(52) U.S. Cl. ...................... 119/719; 119/792; 119/795; 119/858; 119/859; 119/860
(58) Field of Search ................. 119/719, 792, 119/793, 794, 795, 796, 797, 798, 856, 858, 859, 860

(56) References Cited

U.S. PATENT DOCUMENTS

| | | | | |
|---|---|---|---|---|
| 3,072,097 A | * | 1/1963 | Morchand | |
| 4,060,056 A | | 11/1977 | Maietta | 119/96 |
| 4,384,548 A | | 5/1983 | Cohn | 119/109 |
| 4,887,552 A | | 12/1989 | Hayden | 119/109 |
| 5,214,411 A | * | 5/1993 | Herbruck | 340/573 |
| 5,383,426 A | | 1/1995 | Krauss | 119/793 |
| 5,429,075 A | * | 7/1995 | Passarella et al. | 119/795 |
| D362,519 S | | 9/1995 | Jacobsen et al. | D30/153 |
| 5,485,810 A | | 1/1996 | Sporn | 119/792 |
| 5,494,012 A | | 2/1996 | Hagen | 123/196 |
| 5,503,894 A | | 4/1996 | Brown | 428/128 |
| 5,558,044 A | * | 9/1996 | Nasser, Jr. et al. | 119/796 |
| 5,595,143 A | * | 1/1997 | Alberti | 119/794 |
| 5,611,298 A | | 3/1997 | Sporn | 119/792 |
| 5,676,093 A | | 10/1997 | Sporn | 119/792 |
| D389,612 S | | 1/1998 | Jacobsen | D30/153 |
| D389,613 S | | 1/1998 | Jacobsen | D30/153 |
| D389,614 S | | 1/1998 | Jacobsen | D30/153 |
| 5,711,255 A | | 1/1998 | Rudolph | 119/793 |
| 5,724,921 A | * | 3/1998 | Bell | 119/795 |
| 5,740,764 A | | 4/1998 | Jacobsen | 119/798 |
| 5,762,029 A | * | 6/1998 | DuBois et al. | 119/796 |
| 5,775,970 A | | 7/1998 | Klees et al. | 446/297 |
| 5,826,547 A | * | 10/1998 | Gajewska | 119/795 |
| 5,848,576 A | * | 12/1998 | Colaianni | 119/770 |
| 5,887,550 A | * | 3/1999 | Levin et al. | 119/796 |
| 5,901,668 A | * | 5/1999 | Goodger, Sr. | 119/795 |
| 5,934,224 A | | 8/1999 | Sporn | 119/792 |
| 5,967,095 A | * | 10/1999 | Greves | 119/795 |

* cited by examiner

Primary Examiner—Charles T. Jordan
Assistant Examiner—Yvonne R. Abbott
(74) Attorney, Agent, or Firm—Workman, Nydegger & Seeley

(57) ABSTRACT

A dog leash which incorporates a personal security device. The dog leash includes a handle with an ergonomically shaped body that is also padded to facilitate comfort of use. Disposed substantially inside a substantially watertight cavity defined by the handle is a personal security device. The personal security device includes an audible alarm, a battery, and an activation switch selectively operated by the user so as to activate the audible alarm. A hand loop is connected to one end of the body so that when a user's hand is inserted through the hand loop the user's hand may thereby grasp the ergonomically shaped body, and be proximately disposed with respect to the activation switch of the personal security device. A snap swivel is attached to the other end of the ergonomically shaped body, and a split ring depending from the snap swivel removably engages one end of a lead. The other end of the lead has a coupler for attaching the lead to a dog collar.

25 Claims, 3 Drawing Sheets

LEASH

BACKGROUND OF THE INVENTION

1. The Field of the Invention

The present invention relates generally to restraint devices for animals. More particularly, embodiments of the present invention relate to an improved leash which affords comfort in use and contributes to the personal security of the user.

2. The Relevant Technology

For many people, walking a dog is a pleasant and relaxing diversion. Also, the exercise resulting from the walk is beneficial to the health of both the dog and his master. Unfortunately, a walk with one's dog is not always a carefree or safe undertaking. For example, many people walk their dogs in relatively unsafe areas of their community. While virtually any person runs some risk of encountering an assailant or other person with criminal intent, people who walk their dogs in such areas likely face an increased risk of becoming a victim of a criminal act. Unfortunately, many of these people lack a way to effectively ward off an attacker and/or summon assistance.

Due to work schedules or for a variety of other reasons, many people walk their dogs early in the morning or late at night, times when it is dark and when most others are likely to be asleep. Such a person could readily sustain an injury, as a result of the poor visibility that is typical at these times, or become otherwise incapacitated. A person who is walking a dog during these times would have difficulty in attempting to summon assistance in a timely fashion however, since relatively few persons are awake or about late at night or early in the morning.

A number of attempts have been made to resolve the foregoing problems. However, those attempts represent, at best, incomplete solutions. This is particularly true where those who enjoy walking their dogs are concerned.

One example of such an attempt concerns the development of personal security devices such as pepper sprays, mace, and personal alarm systems. Personal security devices typically serve two functions. Some personal security devices are designed primarily with a view towards repelling an assailant. For example, in the case of an attack by an assailant, the personal security device would be activated by the victim and would serve to ward off and/or disable the attacker. Other personal security devices are designed to alert others in the area in the event that a person has suffered an injury or has become otherwise incapacitated and is in need of assistance. As indicated in the discussion below however, these devices are generally inadequate to serve the various needs of people who are out walking their dogs.

One problem with known personal security devices is that a person out walking a dog is likely to have stored the security device in his pocket, so that accessing the personal security device could be difficult or awkward in a panic situation. The problem is further exacerbated if the personal security device is stored in a pocket that is zipped shut or otherwise secured. This problem of accessibility is further aggravated by the fact that many of these personal security devices are contained in a carrying case of some kind, so that in order for the user to access and activate the device, the user is further required to remove the device from its carrying case. Thus, in a case where a person has either been injured or is subject to attack by an assailant, the effectiveness of the personal security device is substantially reduced because the device cannot be readily accessed and/or activated.

The problem of accessibility of the personal security device is particularly acute in the case of a person who is walking a dog on a leash. In particular, because one of the person's hands is occupied holding the leash, the ability of the person walking the dog to access the personal security device may be significantly impaired. Further, if the dog is in an excited state due to the presence of an intruder or assailant, it may take a significant effort by the person walking the dog to control the dog. Thus occupied, it may be difficult or even impossible for the person to access and activate the personal security device. As a result of an inability to ward off an attacker, the person walking the dog could suffer serious injury or even death. In similar fashion, the person who has suffered injury and is unable to alert others to his situation could be forced to wait for an unacceptably long period of time before receiving proper medical attention and/or other aid.

Another problem with known personal security devices concerns the manner in which they are held and employed by the user. Typically, these devices are simply grasped and held in the user's hand so that, for example, a person under attack by an assailant could easily have the personal security device knocked away during the struggle. At best, losing the personal security device in this manner would render it ineffective with regard to the attacker. In the worst case, the attacker could seize the personal security device and use it against the victim.

While personal security is of great interest to them, those who walk their dogs have other concerns as well. For example, many of the leashes currently available tend to emphasize functionality over comfort for the user. Some known leashes are made of leather or other materials, with prominent seams and stitching that dig into the hand of the user and can cause chafing and abrasion over the course of a long walk. This problem, in particular, is further aggravated in the case of a person who is walking a relatively large and/or untrained dog that is difficult to control. The strain of the dog pulling against the leash causes the leash to dig into and abrade the hand of the user. Other leashes are made out of hard, rigid plastics or the like. While such leashes are arguably durable, their hardness and rigidity make them uncomfortable to use.

In view of the foregoing problems, what is needed is an improved leash. Specifically, the leash should, in addition to effectively restraining the animal, contribute to the increased personal security of the user. Also, the leash should be comfortable for the user even when used for long periods of time and/or with large dogs.

SUMMARY AND OBJECTS OF THE INVENTION

The present invention has been developed in response to the current state of the art, and in particular, in response to these and other problems and needs that have not been fully or completely solved by currently available leashes. Thus, it is an overall object of the present invention to provide a leash that will effectively restrain a dog while resolving the aforementioned problems. Embodiments of the present invention are particularly useful where a user desires a leash that is comfortable to use and that will also contribute to his increased personal security.

In a preferred embodiment, the leash includes a padded handle having a hand loop attached thereto. Preferably, the hand loop comprises a resilient material and is integral with the handle. The padded handle also includes a connector adapted for removable attachment to a lead. A personal security device is preferably disposed substantially inside a cavity formed in the padded handle. Note that as contemplated herein, 'personal security devices' include, but are not limited to, devices which when activated, serve to ward off and/or disable an attacker, and/or to summon assistance. Preferably, the personal security device includes audible alarm operably connected to a battery. The flow of power from the battery to the audible alarm, and thus activation of the audible alarm, is preferably controlled by an activation switch that is selectively operated by a user. Thus situated in the padded handle, the personal security device is readily accessible and can be quickly and easily activated by a user when the user's hand has engaged the hand loop.

These and other objects and features of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are not therefore to be considered to be limiting of its scope, the invention and its presently understood best mode for making and using the same will be described and explained with additional specificity and detail through the use of the accompanying drawings in which.

DETAILED DESCRIPTION OF EMBODIMENTS OF THE INVENTION

Reference will now be made to figures wherein like structures will be provided with like reference designations. It is to be understood that the drawings are diagrammatic and schematic representations of various embodiments of the invention, and are not to be construed as limiting the present invention. It should also be noted that the drawings are not necessarily drawn to scale.

Figure 1:
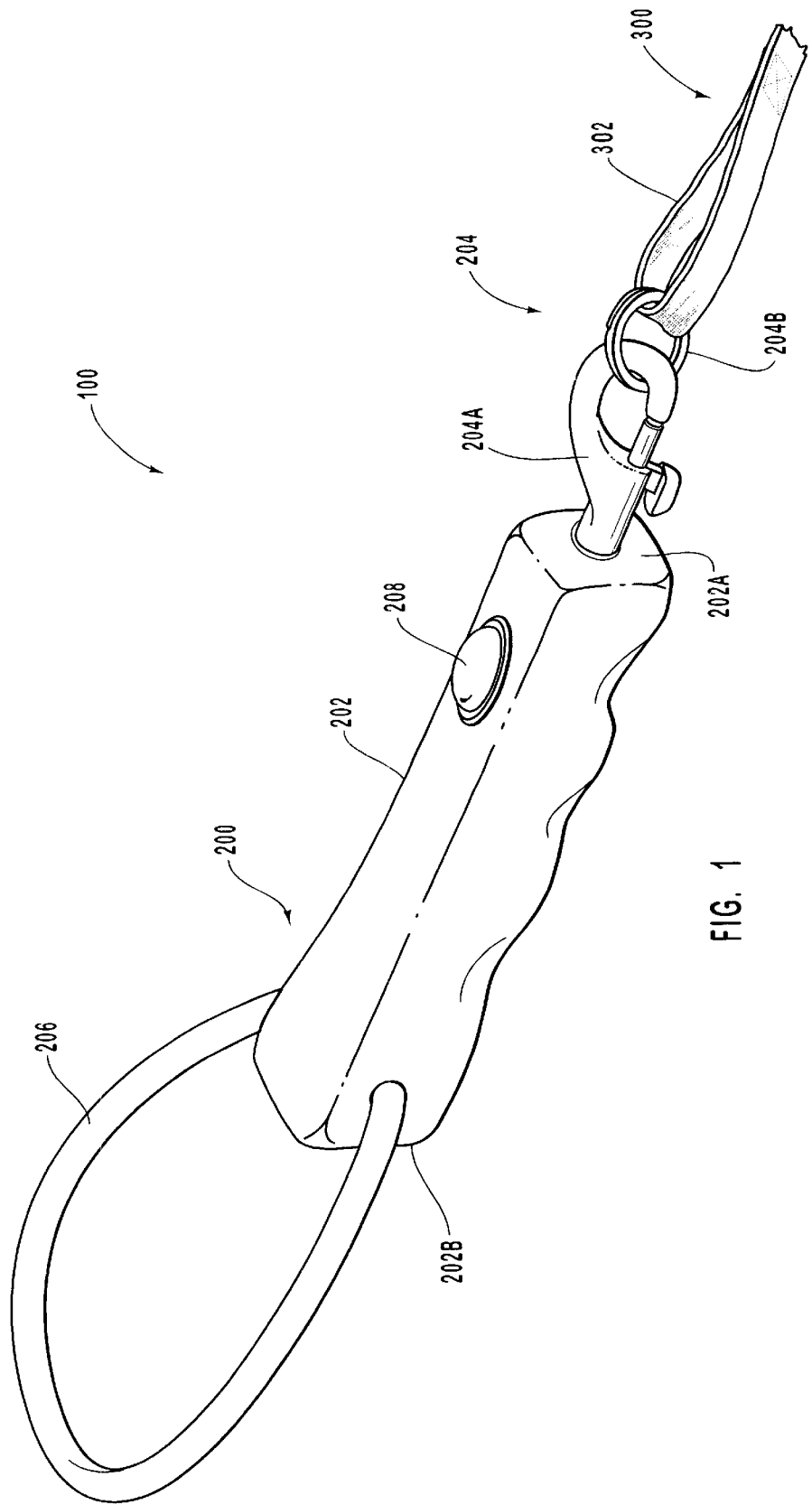
FIG. 1 is a perspective view of an embodiment of a handle of a leash.
Figure 2:
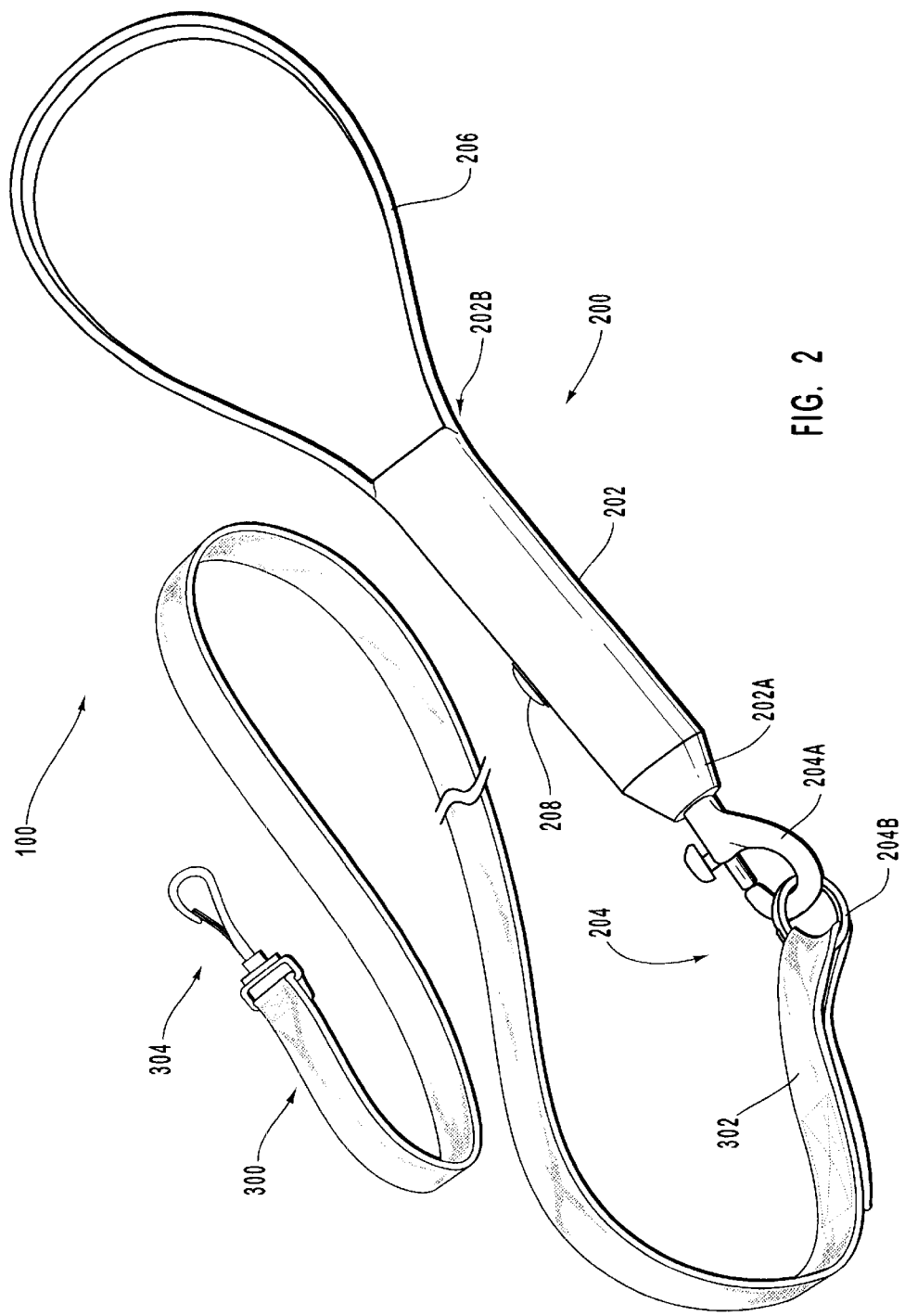
FIG. 2 is a top view of an embodiment of a leash, including a handle and a lead.
Figure 3:
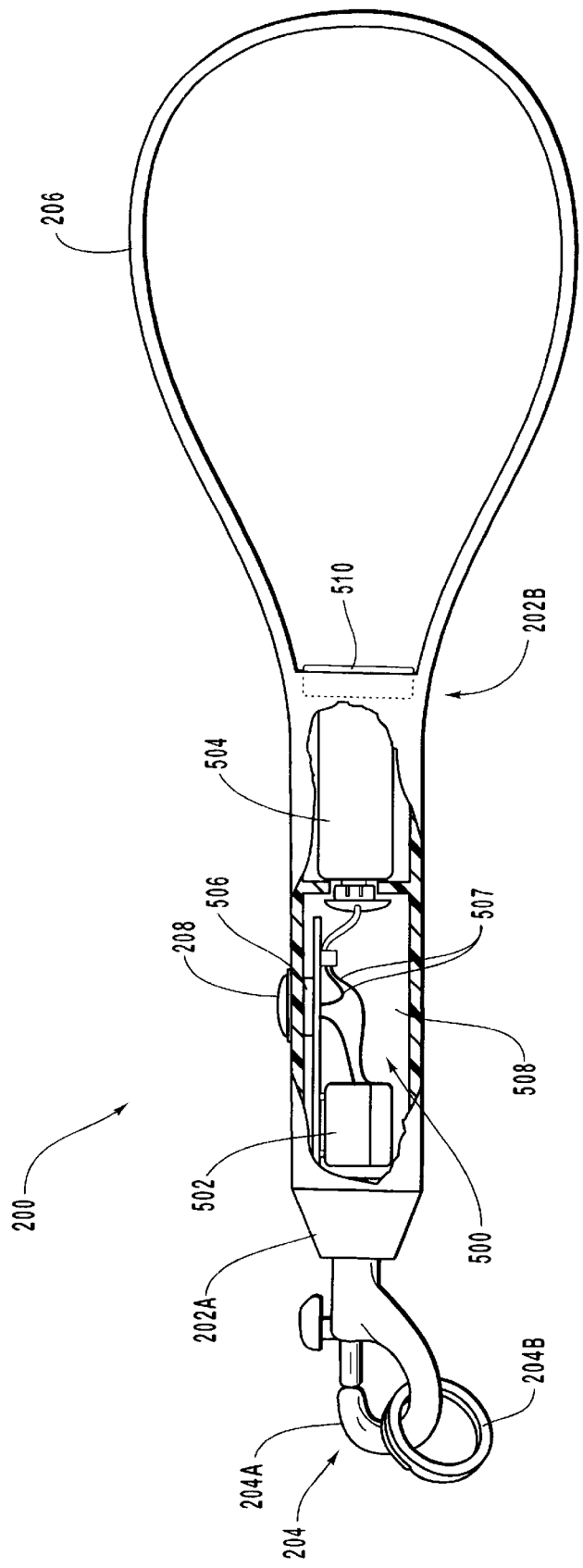
FIG. 3 is a cutaway view of an embodiment of a handle incorporating a personal security device, and indicating various elements of the personal security device.

In general, the present invention relates to a leash for use in restraining a dog while also improving the personal security of the user. FIGS. 1 through 3 indicate various embodiments of a leash conforming to the teachings of the invention. Note that while the embodiments indicated thus are particularly well-suited for use with dogs, it is contemplated that the present invention may be usefully employed with a wide variety of other animals as well.

Reference is first made to FIGS. 1 and 2, which depict a leash, indicated generally at 100. In general, leash 100 comprises a handle 200 and a lead 300, handle 200 being removably attached to lead 300. It is contemplated that leash 100 could be marketed and sold in a variety of ways, including, but not limited to, a leash kit comprising a handle 200 and a plurality of leads 300.

With reference first to handle 200, handle 200 includes a body 202 with a first end 202A and a second end 202B. Body 202 is preferably padded and/or comprises resilient material so as to provide a degree of comfort to the user when the user's hand 400 has engaged handle 200 (see FIG. 1). Resilient materials and padding contemplated as being within the scope of the present invention include, but are not limited to, rubber, foam rubber such as polyurethane, and the like. Further, body 202 of handle 200 preferably comprises an ergonomic shape so that body 202 fits comfortably within the user's hand 400 when grasped thereby. The ergonomic shape and resilient materials of body 202 combine to ensure the comfort of the user over a wide range of usage conditions. Finally, body 202 includes a resilient member 208 comprising a material such as rubber, or the like. Resilient member 208 is preferably integral with body 202. In general, resilient member 208 forms a portion of a substantially watertight cavity defined by body 202, and serves to facilitate activation of a personal security device subtantially disposed inside the cavity. The cavity and personal security device are discussed in greater detail below.

With continuing reference to FIGS. 1 and 2, a connector 204 is attached to first end 202A of body 200. Connector 204 preferably comprises a snap swivel 204A, or the like, and a split ring 204B attached to snap swivel 204A so as to permit easy and selective connection and disconnection of handle 200 to lead 300. In a preferred embodiment, connector 204 is rotatably attached to first end 202A of body 200 so as to facilitate uninhibited movement by lead 300. Note that key rings, jump rings, and the like may be readily substituted for split ring 204B and are accordingly contemplated as being within the scope of the present invention. In an alternative embodiment, split ring 204B may be eliminated, and lead 300 connected directly to snap swivel 204A. In general, the present invention contemplates as within its scope any other type of mechanism or device, or combinations thereof, having the functionality of connector 204 as disclosed herein.

Attached to second end 202B of body 202A is a hand loop 206. Note however, that various other arrangements of hand loop 206 with respect to body 202 may be usefully employed to provide the functionality of hand loop 206 as disclosed herein. As one example, hand loop 206 could be attached to the underside of body 202. Such other arrangements are accordingly contemplated as being within the scope of the present invention. In operation, user hand 400 is inserted through hand loop 206 and grasps body 202. In a preferred embodiment, hand loop 206 is comprised of resilient material and is integral with body 202, as indicated in FIG. 2. The resilient materials used for construction of hand loop 206 and body 202 provide the dual benefits of durability, and comfort to the user. The comfort of handle 200 will be particularly appreciated over the course of long walks, and/or when handle 200 and lead 300 are used with relatively large animals.

As previously noted, leash 100 also comprises a lead 300. It will be appreciated that lead 300 may be comprised of a wide variety of materials including, but not limited to, leather, nylon webbing, or chain. Accordingly, any material, or combination of materials, providing the functionality of lead 300, as disclosed herein, is contemplated as being within the scope of the present invention.

Lead 300 includes a loop 302 for attaching lead 300 to connector 204 of handle 200, and a coupler 304 for removably connecting lead 300 to an animal collar (not shown), or other animal restraint device such as a halter, harness, or the like. It will be appreciated that any device or structure providing the functionality of loop 302, as disclosed herein, is contemplated as being within the scope of the present invention. In one embodiment, coupler 304 comprises a carabiner, however, any device providing the functionality of coupler 304, as disclosed herein, is contemplated as being within the scope of the present invention.

Note as well that a variety of means may be profitably employed to perform the function, disclosed herein, of loop 302. Loop 302 is but one example of a means for engaging lead 300 with connector 204. Other examples of means for engaging lead 300 with connector 204 include, but are not limited to, clips, shackles, clevises, snap swivels, and split rings. Accordingly, the structure disclosed herein simply represents one embodiment of structure capable of performing this function. It should be understood that this structure is presented solely by way of example and should not be construed as limiting the scope of the present invention in any way. The foregoing is germane as well to coupler 304 which is but one example of a means for attaching lead 300 to an animal collar (not shown).

Finally, as suggested in FIGS. 1 and 2, handle 200 of leash 100 comprises a personal security device 500. The construction and operational details of various embodiments of personal security device 500 are addressed in detail in the discussion of FIG. 3 below.

Directing attention now to FIG. 3, additional details of an embodiment of a handle 200 having a personal security device 500 are indicated. In a preferred embodiment, personal security device 500 is disposed entirely within a cavity 508 defined by handle 200. Cavity 508 is preferably substantially watertight. This feature of cavity 508 is effective in substantially preventing water, snow, dirt, or other foreign matter from entering the cavity and disrupting, preventing, or otherwise inhibiting the operation of personal security device 500.

As noted above, the embodiment of the present invention indicated in FIG. 3 discloses a personal security device 500 disposed substantially inside body 202 of handle 200. However, the present invention contemplates as within its scope any other arrangement whereby a personal security device 500 is disposed in proximity to body 202 of handle 200 such that the functionality of personal security device 500, as disclosed herein, is attained and maintained. The present invention also contemplates that these other arrangements would incorporate the resistance to ingress of foreign material that is characteristic of cavity 508.

With continuing reference now to FIG. 3, one embodiment of personal security device 500 preferably includes an audible alarm 502 which is operably connected to power source 504 and activation switch 506 by wires 507 or other conductors. Power source 504 preferably comprises a battery or the like, disposed within cavity 508. Cavity 508 includes an access cover 510 to permit selective removal and replacement of power source 504.

Generally, the user selectively activates audible alarm 502 by depressing resilient member 208 in handle 200. Because resilient member 208 is disposed in operative relation with activation switch 506, depression of resilient member 208 a first time causes activation switch to electrically connect power source 504 to audible alarm 502, thereby allowing power to flow from power source 504 to audible alarm 502, and thus activating audible alarm 502. The convenient location of resilient member 208 on handle 202 thus facilitates easy access to, and activation of, personal security device 500 by the user. Likewise, the simple construction of personal security device 500 ensures reliable and consistent activation and operation thereof.

By selectively depressing resilient member 208 a second time, the user causes activation switch 506 to break the electrical connection between power source 504 and audible alarm 502, thereby deactivating audible alarm 502. In an alternative embodiment, audible alarm 502 can be deactivated only by removing power source 504. This feature prevents, among other things, deactivation of the device by a would-be assailant.

As discussed above, one embodiment of the present invention incorporates a personal security device which comprises an audible alarm. However, it will be appreciated that personal security devices incorporating a wide variety of other capabilities, either alone or in combination, may be profitably employed as well. As one example, an alarm could be employed that emits a frequency audible only to canines, so that when activated, the alarm would excite the dog and cause him to bark and thereby repel a would-be assailant and/or call attention to the user. As another example, an alarm that is in communication with a remote monitoring site could be employed, so that when activated, the alarm would notify personnel at the remote monitoring site that the user was in need of assistance.

It will also be appreciated that a wide variety of devices exist which are capable of effectively performing the functions of activation switch 506, as disclosed herein. One such exemplary device is a switch having an activation member protruding from body 202 (thereby precluding the need for resilient member 208) which can be slidingly operated by the user to selectively activate and deactivate an alarm. However, any device having the functionality of activation switch 506 is contemplated as being within the scope of the present invention.

Finally, note that personal security devices, as contemplated by the present invention, include not just electronic personal security devices such as those discussed above, but a variety of other types of personal security devices as well. Such other personal security devices contemplated include, but are not limited to, chemical repellant devices, and the like. The present invention accordingly contemplates as within its scope any personal security device which, when activated, serves to ward off and/or disable a would-be assailant, and/or to summon assistance.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A dog leash, comprising:
   (a) a padded handle, said padded handle including an ergonomically shaped body with an integral hand loop at a first end of said ergonomically shaped body and a snap swivel attached to a second end of said ergonomically shaped body, a split ring being attached to said snap swivel, and said ergonomically shaped body defining a substantially watertight cavity;
   (b) a personal security device disposed substantially within said substantially watertight cavity, said personal security device including an audible alarm connected to a battery, and an activation switch selectively operated by a user serving to activate and inactivate said audible alarm by forming and breaking, respectively, an electrical connection between said battery and said audible alarm; and (c) a lead, said lead being detachably engaged with said split ring attached to said snap swivel.

2. The dog leash as recited in claim 1, wherein said ergonomically shaped body comprises a resilient material.

3. The dog leash as recited in claim 1, wherein said resilient material is selected from the group consisting of: rubber, foam rubber, and polyurethane.

4. The dog leash as recited in claim 1, wherein said body is sized so that a substantial portion thereof is capable of fitting within the hand of a user.

5. The dog leash as recited in claim 1, wherein said lead substantially comprises material selected from the group consisting of: leather, nylon webbing, and chain.

6. The dog leash as recited in claim 1, wherein said lead firther comprises a coupler.

7. A leash suitable for use with an animal, comprising:
(a) a handle including a body with a hand loop attached to a first end of said body and a connector attached to a second end of said body;
(b) a personal security device disposed substantially within said body of said handle, said personal security device comprising an audible alarm connected to a battery, and said personal security device further comprising an activation switch connected between said battery and said audible alarm; and
(c) a lead, said lead being detachably engaged with said connector.

8. The leash as recited in claim 7, wherein said body is ergonomically configured.

9. The leash as recited in claim 7, wherein said body is sized so that a substantial portion thereof is capable of fitting within the hand of a user.

10. The leash as recited in claim 7, wherein said connector comprises a split ring and snap swivel.

11. The leash as recited in claim 7, wherein said body substantially comprises a resilient material.

12. The leash as recited in claim 7, wherein said body at least partially defines a substantially watertight cavity within which sa security device is disposed.

13. The leash as recited in claim 7, wherein said hand loop is integral with said body.

14. The leash as recited in claim 7, wherein at least a portion of said handle is padded.

15. The leash as recited in claim 7, wherein said audible alarm emits sound having a frequency audible only to canines.

16. A leash suitable for use with an animal, comprising:
(a) a handle including a body with a hand loop attached to a first end of said body and a connector attached to a second end of said body;
(b) a personal security device disposed substantially within said body of said handle, said personal security device being selected from the group consisting of: chemical repellant devices, and circuits including an audible alarm connected to a battery and activation switch; and
(c) a lead, said lead being detachably engaged with said connector.

17. The leash as recited in claim 16, wherein said body is ergonomically configured.

18. The leash as recited in claim 16, wherein said body is sized so that a substantial portion thereof is capable of fitting within the hand of a user.

19. The leash as recited in claim 16, wherein said connector comprises a split ring and snap swivel.

20. The leash as recited in claim 16, wherein said body substantially comprises a resilient material.

21. The leash as recited in claim 16, wherein said body at least partially defines a substantially watertight cavity within which said personal security device is disposed.

22. The leash as recited in claim 16, wherein said hand loop is integral with said body.

23. The leash as recited in claim 16, wherein at least a portion of said handle is padded.

24. The leash as recited in claim 16, wherein said audible alarm emits sound having a frequency audible only to canines.

25. The leash as recited in claim 16, further comprising a resilient member attached to said body of said handle and in operative communication with said personal security device.

\* \* \* \* \*